(12) United States Patent
van de Ven et al.

(10) Patent No.: US 9,066,382 B2
(45) Date of Patent: Jun. 23, 2015

(54) APPARATUS AND METHODS FOR CONTROL OF A LIGHT EMITTING DEVICE USING POWER LINE COMMUNICATION

(75) Inventors: Antony P. van de Ven, Sai Kung (HK); Joseph P. Chobot, Morrisville, NC (US)

(73) Assignee: Cree, Inc., Durham, NC (US)

( * ) Notice: Subject to any disclaimer, the term of this patent is extended or adjusted under 35 U.S.C. 154(b) by 403 days.

(21) Appl. No.: 13/331,795

(22) Filed: Dec. 20, 2011

(65) Prior Publication Data

US 2013/0154502 A1    Jun. 20, 2013

(51) Int. Cl.
G05F 1/00 (2006.01)
H05B 37/02 (2006.01)
H05B 33/08 (2006.01)

(52) U.S. Cl.
CPC ........ *H05B 37/0263* (2013.01); *H05B 33/0857* (2013.01)

(58) Field of Classification Search
USPC ......... 315/291, 224, 294, 295, 297, 306, 307, 315/312
See application file for complete search history.

(56) References Cited

U.S. PATENT DOCUMENTS

| | | | |
|---|---|---|---|
| 7,139,483 B2 * | 11/2006 | Murase et al. | 398/72 |
| 2009/0171510 A1 | 7/2009 | Hu | |
| 2009/0267538 A1 * | 10/2009 | Mantovani | 315/297 |
| 2009/0289578 A1 * | 11/2009 | Peng | 315/294 |
| 2010/0079262 A1 | 4/2010 | Van Laanen | |
| 2010/0283401 A1 * | 11/2010 | Chung et al. | 315/250 |
| 2011/0018912 A1 * | 1/2011 | Adachi et al. | 345/690 |
| 2011/0148318 A1 * | 6/2011 | Shackle et al. | 315/291 |
| 2011/0227489 A1 * | 9/2011 | Huynh | 315/185 R |
| 2011/0279057 A1 * | 11/2011 | Briggs | 315/294 |

OTHER PUBLICATIONS

International Search Report Corresponding to International Application No. PCT/US12/70800; Date of Mailing: Mar. 8, 2013; 8 Pages.
Notification Concerning Transmittal of International Preliminary Report on Patentability in corresponding PCT Application No. PCT/US2012/070800 mailed Jul. 3, 2014 (6 pages).

* cited by examiner

*Primary Examiner* — Minh D A
(74) *Attorney, Agent, or Firm* — Myers Bigel Sibley & Sajovec, PA

(57) ABSTRACT

A lighting apparatus includes a light emitting device that has an attribute that is adjustable responsive to a control signal carried on a power line from which the light emitting device receives an Alternating Current (AC) power signal.

36 Claims, 3 Drawing Sheets

APPARATUS AND METHODS FOR CONTROL OF A LIGHT EMITTING DEVICE USING POWER LINE COMMUNICATION

FIELD OF THE INVENTION

The present invention relates to lighting devices and, more particularly, to apparatus and methods for control of lighting apparatus.

BACKGROUND

Solid state lighting arrays are used for a number of lighting applications. For example, solid state lighting panels including arrays of solid state light emitting devices have been used as direct illumination sources, for example, in architectural and/or accent lighting. A solid state light emitting device may include, for example, a packaged light emitting device including one or more light emitting diodes (LEDs). The LEDs may include, for example, inorganic LEDs that include semiconductor layers forming p-n junctions and/or organic LEDs (OLEDs) that include organic light emission layers.

In illumination applications, it is often desirable to adjust one or more attributes of an LED that is part of a lighting apparatus. For example, it may be desirable to adjust such attributes as the luminance, chromanicity, and/or color point of an LED.

SUMMARY

Some embodiments provide a lighting apparatus that includes a light emitting device having an attribute that is adjustable responsive to a control signal carried on a power line from which the light emitting device receives an Alternating Current (AC) power signal.

In other embodiments, the light emitting device is a light-emitting diode (LED) and the attribute is a luminance of the LED.

In still other embodiments, the light emitting device is a light-emitting diode (LED) and the attribute is a chromanicity of the LED.

In still other embodiments, the light emitting device is a light-emitting diode (LED) and the attribute is a red-green-blue (RGB) color of the LED.

In still other embodiments, the attribute includes a first attribute and a second attribute and the control signal includes a first control signal and a second control signal, the first attribute being adjustable responsive to the first control signal and the second attribute being adjustable responsive to the second control signal.

In still other embodiments, the light emitting device includes a plurality of light-emitting diodes (LEDs) and each of the plurality of light emitting diodes has an attribute that is adjustable responsive to the control signal.

In still other embodiments, the attribute of one of the plurality of LEDs is different from the attribute of another one of the plurality of LEDs.

In still other embodiments, the light emitting device includes a plurality of light-emitting diodes (LEDs). Each of the plurality of LEDs has a receiver circuit associated therewith that is configured to decode an address associated the respective LED.

In still other embodiments, the address is based on a frequency of the control signal.

In still other embodiments, the address is based on address data encoded in the control signal.

In still other embodiments, the control signal is frequency modulated.

In still other embodiments, the control signal is amplitude modulated.

In still other embodiments, the control signal is phase modulated.

In still other embodiments, the control signal is pulse width modulated.

In further embodiments of the present inventive subject matter, a method of operating lighting apparatus includes transmitting a control signal on a power line that carries an Alternating Current (AC) power signal to adjust an attribute of a light emitting device that is responsive to the control signal.

In still further embodiments, the light emitting device is a light-emitting diode (LED) and the attribute is a luminance of the LED.

In still further embodiments, the light emitting device is a light-emitting diode (LED) and the attribute is a chromanicity of the LED.

In still further embodiments, the light emitting device is a light-emitting diode (LED) and the attribute is a red-green-blue (RGB) color of the LED.

In still further embodiments, the method further includes receiving a user selection of the attribute.

In still further embodiments, the light emitting device is a first light emitting device of a plurality of light emitting devices and transmitting the control signal includes transmitting the control signal on the power line to adjust the attribute of the first light emitting device, the control signal including address information associated with the first light emitting device.

In still further embodiments, the control signal is frequency modulated.

In still further embodiments, the control signal is amplitude modulated.

In still further embodiments, the control signal is phase modulated.

In still further embodiments, the control signal is pulse width modulated.

In other embodiments of the present inventive subject matter, a circuit includes a control circuit that is configured to generate a control signal on a power line used to supply a light emitting device with an Alternating Current (AC) power signal, the control signal being configured to adjust an attribute of the light emitting device.

In still other embodiments, the light emitting device is a light-emitting diode (LED) and the attribute is a luminance of the LED.

In still other embodiments, the light emitting device is a light-emitting diode (LED) and the attribute is a chromanicity of the LED.

In still other embodiments, the light emitting device is a light-emitting diode (LED) and the attribute is a red-green-blue (RGB) color of the LED.

In still other embodiments, the control signal is frequency modulated.

In still other embodiments, the control signal is amplitude modulated.

In still other embodiments, the control signal is phase modulated.

In still other embodiments, the control signal is pulse width modulated.

In further embodiments of the present inventive subject matter a circuit is operated by generating a control signal on a power line used to supply a light emitting device with an Alternating Current (AC) power signal, the control signal being configured to adjust an attribute of the light emitting device.

In still further embodiments, the light emitting device is a light-emitting diode (LED) and the attribute is a luminance of the LED.

In still further embodiments, the light emitting device is a light-emitting diode (LED) and the attribute is a chromanicity of the LED.

In still further embodiments, the light emitting device is a light-emitting diode (LED) and the attribute is a red-green-blue (RGB) color of the LED.

In still further embodiments, the control signal is frequency modulated.

In still further embodiments, the control signal is amplitude modulated.

In still further embodiments, the control signal is phase modulated.

In still further embodiments, the control signal is pulse width modulated.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS

Figure 1A:
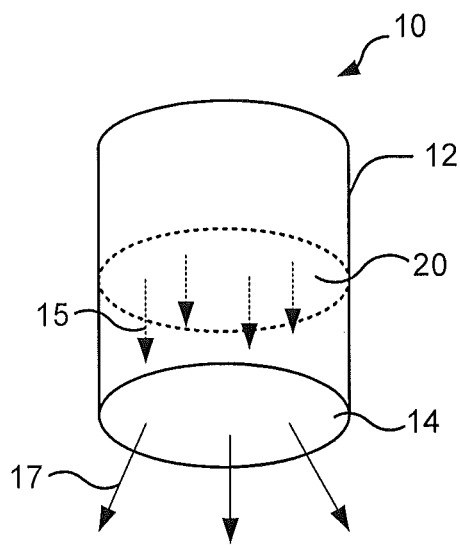
FIGS. 1A and 1B illustrate a solid state lighting apparatus in accordance with some embodiments of the inventive subject matter.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The following description of some embodiments of the inventive subject matter refers to "light-emitting devices," which may include, but is not limited to, solid-state lighting devices, such as light emitting diode (LED) devices. As used herein, "LED" includes, but is not limited to, direct-emission devices that produce light when a voltage is applied across a PN junction thereof, as well as combinations of such direct-emission devices with luminescent materials, such as phosphors that emit visible-light radiation when excited by a source of radiation, such as a direct-emission device.

Some embodiments of the present inventive subject matter stem from a realization that power line communication (PLC) can be used to adjust one or more attributes of a solid state light emitting device, such as a light-emitting diode (LED). The attributes may include, but are not limited to luminance, chromanicity, red-green-blue (RGB) color, and the like. More specifically, a control signal may be imposed on the power line that is modulated in such a way to encode information for adjusting one or more attributes of the light emitting device. For example, the signal may be frequency modulated, amplitude modulated, phase modulated, pulse width modulated, or otherwise encoded with data indicating a desired characteristic of the light emitting device. In some embodiments, multiple control signals may be imposed on the power line to adjust a plurality of different attributes of a single light emitting device.

A lighting apparatus may have multiple light emitting devices and, in accordance with some embodiments of the inventive subject matter, each of the light emitting devices may respond in like manner to a control signal such that the same attribute is adjusted on each of the light emitting devices. In other embodiments of the inventive subject matter, different attributes on different light emitting devices may be adjusted using the same control signal. Such differences may be designed in the respective light emitting devices and/or may be programmable to allow a user to select which attribute is adjustable in response to a particular control signal. The individual light emitting devices comprising a light apparatus may be individually addressable in some embodiments using, for example, bandpass filters and/or addressing decoding circuitry.

Figure 1B:
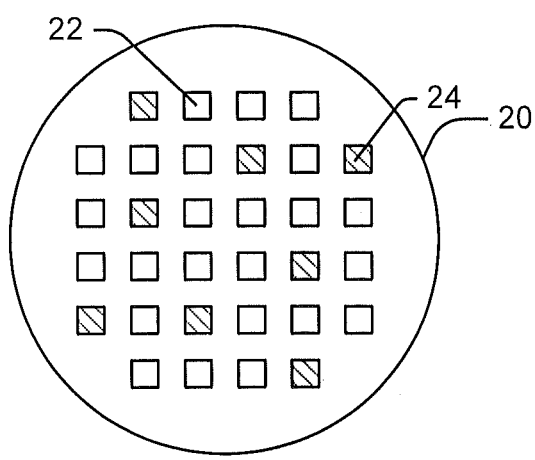

Referring to FIGS. 1A and 1B, a lighting apparatus 10 according to some embodiments is illustrated. The lighting apparatus 10 shown in FIGS. 1A and 1B is a "recessed downlight" or "can" lighting fixture that may be suitable for use in general illumination applications as a down light or spot light. However, it will be appreciated that a lighting apparatus according to some embodiments may have a different form factor. For example, a lighting apparatus according to some embodiments can have the shape of a conventional light bulb, a pan or tray light, an automotive headlamp, or any other suitable form.

The lighting apparatus 10 generally includes a can-shaped outer housing 12 in which a lighting panel 20 is arranged. In the embodiments illustrated in FIGS. 2A and 2B, the lighting panel 20 has a generally circular shape so as to fit within an interior of the cylindrical housing 12. Light is generated by solid state lighting devices (LEDs) 22, which are mounted on the lighting panel 20, and which are arranged to emit light 15 towards a diffusing lens 14 mounted at the end of the housing 12. Diffused light 17 is emitted through the lens 14. In some embodiments, the lens 14 may not diffuse the emitted light 15, but may redirect and/or focus the emitted light 15 in a desired near-field or far-field pattern. The LEDs 22 may include LEDs of different chromaticities that may be controlled to produce a desired intensity or color using various techniques discussed in detail below.

Figure 2:
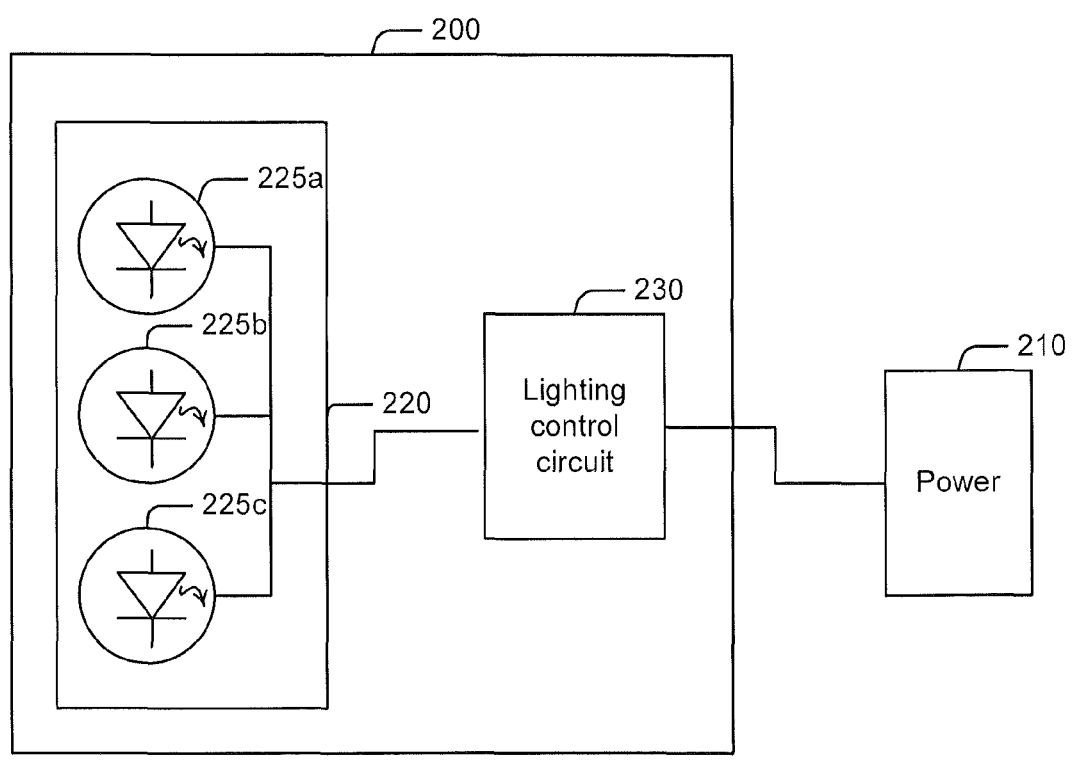
FIG. 2 is a block diagram of a solid state lighting system that includes a solid state lighting apparatus that is controllable using power line communication (PLC) according to some embodiments of the inventive subject matter.

FIG. 2 is a block diagram of a solid state lighting system 200 that includes a solid state lighting apparatus 220 that is controllable using power line communication (PLC) according to some embodiments of the inventive subject matter. The solid state lighting system 200 comprises a lighting control circuit 230 that is connected between the solid state lighting apparatus 220 and a power source 210. The lighting apparatus 220 includes one or more light emitting devices 225. As shown in FIG. 2, the lighting apparatus 220 includes three light emitting devices 225a, 225b, and 225c. In some embodiments of the inventive subject matter, the light emitting devices 225a, 225b, and 225c may be LEDs. Although the lighting apparatus 220 is shown as including three light emitting devices 225a, 225b, and 225c, it will be understood that the lighting may include any number of light emitting devices.

The lighting control circuit 230 may be used to control one or more attributes of the light emitting devices 225a, 225b, 225c through use of PLC. The lighting control circuit 230 impresses one or more control signals on the wiring used to carry electrical power from the power source 210 to the lighting apparatus 220. The one or more control signals may comprise one or more modulated carrier signals. Various types of modulation techniques can be used in accordance with different embodiments of the inventive subject matter. Power distribution wiring is generally designed for transmission of AC power at frequencies around 50 Hz-60 Hz. While power line wiring and circuitry may be able to carry higher frequencies, such capability may be limited based on the type of wiring and circuitry used along with the distance the signal propagates before reaching the lighting apparatus 220. The control signals may be frequency modulated, amplitude modulated, phase modulated, and/or pulse width modulated in accordance with various embodiments.

In some embodiments of the inventive subject matter, a control signal generated by the lighting control circuit 230 is used to control one or more attributes of a light emitting device, such as the light emitting devices 225a, 225b, and 225c. The attributes may include, but are not limited to, luminance, chromanicity, red-green-blue (RGB) color, and the like. As shown in FIG. 2, multiple light emitting devices 225a, 225b, and 225c may receive the same control signal from the lighting control circuit 230 and the same attribute of each of the multiple light emitting devices 225a, 225b, and 225c may be adjusted on each device using the same control signal. In other embodiments, the lighting control circuit 230 may use multiple control signals to adjust or control multiple attributes, respectively, on each of the light emitting devices 225a, 225b, and 225c.

The light emitting devices 225a, 225b, and 225c may, however, be configured to respond differently to the same control signal generated by the lighting control circuit 230. For example, one of the light emitting devices 225a may be configured such that a control signal generated by the lighting control circuit 230 adjusts the chromanicity attribute of the light emitting device 225a. Another one of the light emitting devices 225b may be configured such that the same control signal used to adjust the chromanicity of the light emitting device 225a adjusts the luminance attribute of the light emitting device 225b.

Figure 3:
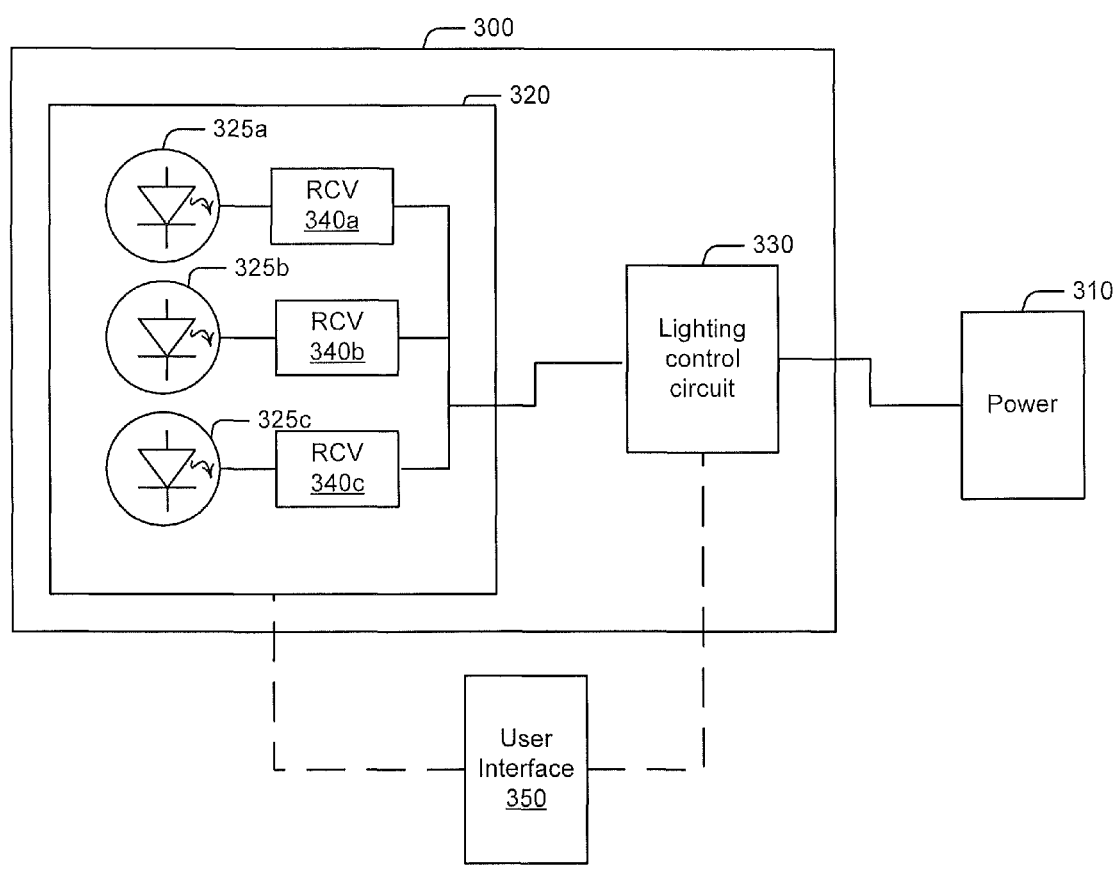
FIG. 3 is a block diagram of a solid state lighting system that includes a solid state lighting apparatus with individually addressable lighting elements that are controllable using PLC according to some embodiments of the inventive subject matter.

FIG. 3 is a block diagram of a solid state lighting system 300 that includes a solid state lighting apparatus 320 with individually addressable lighting elements that are controllable using PLC according to some embodiments of the inventive subject matter. The solid state lighting system 300 comprises a lighting control circuit 330 that is connected between the solid state lighting apparatus 320 and a power source 310. The lighting apparatus 320 includes one or more light emitting devices 325. As shown in FIG. 3, the lighting apparatus 320 includes three light emitting devices 325a, 325b, and 325c. In some embodiments of the inventive subject matter, the light emitting devices 325a, 325b, and 325c may be LEDs. Although the lighting apparatus 320 is shown as including three light emitting devices 325a, 325b, and 325c, it will be understood that the lighting may include any number of light emitting devices.

Operation of the solid state lighting system 300 is similar to that of the solid state lighting system 200 of FIG. 2. The solid state lighting system 300, however, includes receiver circuits 340a, 340b, and 340c, which are configured to facilitate individual addressing of the light emitting devices 325a, 325b, and 325c, respectively. For example, the receiver circuits 340a, 340b, and 340c may each comprise a bandpass filter that is configured to pass signals within a specific frequency range to the light emitting device 325 associated therewith. Thus, a particular address of a light emitting device 325a, 325b, and 325c may be represented by a particular frequency or frequency band. In other embodiments, the receiver circuits 340a, 340b, and 340c may each comprise a decoder that is designed to decode a control signal received from the lighting control circuit 330 and obtain address information therefrom. If the address corresponds to the associated light emitting device 325, then the attribute of the particular light emitting device 325 is adjusted appropriately based on the control signal. In this way, the lighting control circuit 330 may adjust the attributes of the different light emitting devices 325a, 325b, and 325c on an individual basis.

As described above with respect to FIG. 2, the light emitting devices 325a, 325b, and 325c may be configured to respond the same or differently to the same control signal generated by the lighting control circuit 330. In the embodiments illustrated in FIG. 3, however, a user interface 350 may be used to communicate with the lighting apparatus 320 and/or the lighting control circuit 330 to program which attribute of a particular light emitting device 325 is adjusted using a particular control signal. For example, the user interface 350 may be used to program a register in each of the receiver circuits 340a, 340b, and 340c either directly through the lighting apparatus 320 or indirectly through the lighting control circuit 330, which specifies which attribute is adjusted in response to a particular control signal.

Embodiments of the present inventive subject matter may allow for control of light emitting devices through the use of existing wiring without the need for additional control lines. The control signal may be isolated from a lighting control circuit to the lighting apparatus and, because the carrier signal(s) used to implement the control signal(s) is imposed on the noise as well as the AC line signal, a relatively high level of noise rejection may be obtained without the need for special filtering. Moreover, because the carrier signal(s) are imposed onto the AC power waveform, the full power waveform is available for driving the lighting apparatus. Thus, dimming, for example, may be controlled using a control signal rather than using such techniques as phase cut dimming where the AC power waveform is rectified to control light intensity.

In the drawings and specification, there have been disclosed typical embodiments of the inventive subject matter and, although specific terms are used, they are used in a generic and descriptive sense only and not for purposes of limitation, the scope of the invention being set forth in the following claims.

That which is claimed:

1. A lighting apparatus comprising:
   a light emitting device having an attribute that is adjustable responsive to a control signal carried on a power line from which the light emitting device receives an Alternating Current (AC) power signal;
   wherein the light emitting device comprises a plurality of light-emitting diodes (LEDs) and wherein each of the plurality of LEDs has a receiver circuit associated therewith that is configured to decode an address associated with the respective LED; and
   wherein the address is based on a frequency of the control signal.

2. The lighting apparatus of claim 1, wherein the light emitting device is a light-emitting diode (LED) and the attribute is a luminance of the LED.

3. The lighting apparatus of claim 1, wherein the light emitting device is a light-emitting diode (LED) and the attribute is a chromanicity of the LED.

4. The lighting apparatus of claim 1, wherein the light emitting device is a light-emitting diode (LED) and the attribute is a red-green-blue (RGB) color of the LED.

5. The lighting apparatus of claim 1, wherein the attribute comprises a first attribute and a second attribute and the control signal comprises a first control signal and a second control signal, the first attribute being adjustable responsive to the first control signal and the second attribute being adjustable responsive to the second control signal.

6. The lighting apparatus of claim 1, wherein the light emitting device comprises a plurality of light-emitting diodes (LEDs) and wherein each of the plurality of light emitting diodes has an attribute that is adjustable responsive to the control signal.

7. The lighting apparatus of claim 6, wherein the attribute of one of the plurality of LEDs is different from the attribute of another one of the plurality of LEDs.

8. The lighting apparatus of claim 1, wherein the control signal is frequency modulated.

9. The lighting apparatus of claim 1, wherein the control signal is amplitude modulated.

10. The lighting apparatus of claim 1, wherein the control signal is phase modulated.

11. The lighting apparatus of claim 1, wherein the control signal is pulse width modulated.

12. A method of operating a lighting apparatus, comprising:
    transmitting a control signal on a power line that carries an Alternating Current (AC) power signal to adjust an attribute of a light emitting device that is responsive to the control signal;
    wherein the light emitting device is a first light emitting device of a plurality of light emitting devices and wherein each of the plurality of light emitting devices has a receiver circuit associated therewith that is configured to decode address information associated with the respective light emitting device; and
    wherein transmitting the control signal comprises:
    transmitting the control signal on the power line to adjust the attribute of the first light emitting device, the control signal including the address information associated with the first light emitting device;
    wherein the address information is based on a frequency of the control signal.

13. The method of claim 12, wherein the light emitting device is a light-emitting diode (LED) and the attribute is a luminance of the LED.

14. The method of claim 12, wherein the light emitting device is a light-emitting diode (LED) and the attribute is a chromanicity of the LED.

15. The method apparatus of claim 12, wherein the light emitting device is a light-emitting diode (LED) and the attribute is a red-green-blue (RGB) color of the LED.

16. The method of claim 12, further comprising:
    receiving a user selection of the attribute.

17. The method of claim 12, wherein the control signal is frequency modulated.

18. The method of claim 12, wherein the control signal is amplitude modulated.

19. The method of claim 12, wherein the control signal is phase modulated.

20. The method of claim 12, wherein the control signal is pulse width modulated.

21. A circuit, comprising:
    a control circuit that is configured to generate a control signal on a power line used to supply a light emitting device with an Alternating Current (AC) power signal, the control signal being configured to adjust an attribute of the light emitting device;
    wherein the light emitting device is a first light emitting device of a plurality of light emitting devices and wherein each of the plurality of light emitting devices has a receiver circuit associated therewith that is configured to decode address information associated with the respective light emitting device:
    wherein the control signal comprises the address information associated with the first light emitting device; and
    wherein the address information is based on a frequency of the control signal.

22. The circuit of claim 21, wherein the light emitting device is a light-emitting diode (LED) and the attribute is a luminance of the LED.

23. The circuit of claim 21, wherein the light emitting device is a light-emitting diode (LED) and the attribute is a chromanicity of the LED.

24. The circuit of claim 21, wherein the light emitting device is a light-emitting diode (LED) and the attribute is a red-green-blue (RGB) color of the LED.

25. The circuit of claim 21, wherein the control signal is frequency modulated.

26. The circuit of claim 21, wherein the control signal is amplitude modulated.

27. The circuit of claim 21, wherein the control signal is phase modulated.

28. The circuit of claim 21, wherein the control signal is pulse width modulated.

29. A method of operating a circuit, comprising:
generating a control signal on a power line used to supply a light emitting device with an Alternating Current (AC) power signal, the control signal being configured to adjust an attribute of the light emitting device;
wherein the light emitting device is a first light emitting device of a plurality of light emitting devices and wherein each of the plurality of light emitting devices has a receiver circuit associated therewith that is configured to decode address information associated with the respective light emitting device:
wherein the control signal comprises the address information associated with the first light emitting device; and
wherein the address information is based on a frequency of the control signal.

30. The method of claim 29, wherein the light emitting device is a light-emitting diode (LED) and the attribute is a luminance of the LED.

31. The method of claim 29, wherein the light emitting device is a light-emitting diode (LED) and the attribute is a chromanicity of the LED.

32. The method of claim 29, wherein the light emitting device is a light-emitting diode (LED) and the attribute is a red-green-blue (RGB) color of the LED.

33. The method of claim 29, wherein the control signal is frequency modulated.

34. The method of claim 29, wherein the control signal is amplitude modulated.

35. The method of claim 29, wherein the control signal is phase modulated.

36. The method of claim 29, wherein the control signal is pulse width modulated.

* * * * *